April 4, 1939.  H. WENDEBORN  2,152,718

PROCESS FOR THE PRODUCTION OF SINTERED PRODUCTS

Original Filed May 13, 1937  3 Sheets-Sheet 1

Inventor:
Helmut Wendeborn
BY
a. M. Weller
ATTORNEY

April 4, 1939.  H. WENDEBORN  2,152,718
PROCESS FOR THE PRODUCTION OF SINTERED PRODUCTS
Original Filed May 13, 1937   3 Sheets-Sheet 2
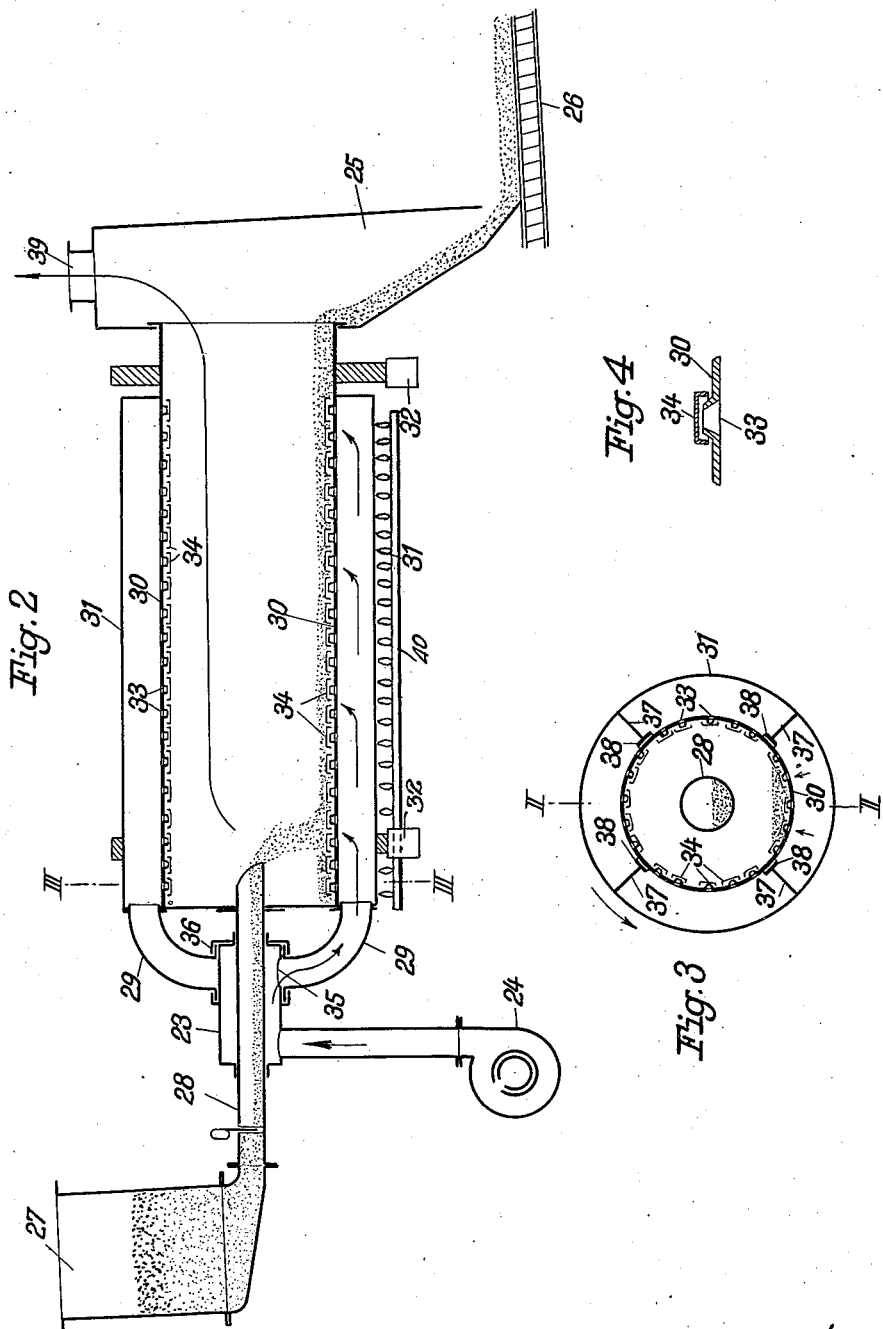
Inventor:
Helmut Wendeborn
By A. W. Deller
Attorney April 4, 1939. H. WENDEBORN 2,152,718
PROCESS FOR THE PRODUCTION OF SINTERED PRODUCTS
Original Filed May 13, 1937 3 Sheets-Sheet 3

Inventor:
Helmut Wendeborn
By A. A. Weller
Attorney

Patented Apr. 4, 1939

2,152,718

UNITED STATES PATENT OFFICE 2,152,718

PROCESS FOR THE PRODUCTION OF SINTERED PRODUCTS

Helmut Wendeborn, Frankfort-on-the-Main, Germany, assignor to American Lurgi Corporation, New York, N. Y., a corporation of New York Original application May 13, 1937, Serial No. 142,375. Divided and this application December 27, 1937, Serial No. 181,816. In Germany May 20, 1936

9 Claims. (Cl. 263—53)

This application is a division from my application, S. N. 142,375, dated May 13, 1937.

This invention relates to a process for the production of a sintered product.

The first practical solution of the problem of either manufacturing cement by sintering on blast grates—especially induced-draught grates— the finely ground originating materials, subsequently transformed into a granular or crumbly condition, or of treating other endothermic fine materials likewise subsequent to their transforming into a granular or crumbly condition, consisted in subjecting a mixture of the originating materials and the sinter returns, to a sintering operation. In this process it was also important to render the charge on the blast roasting grate sufficiently pervious to air by the granulation. To this end, according to one known process, the raw material was strewn over moistened cores of sinter returns, while the latter were being rolled in a drum. In this manner the cores become coated with thin shells of cement raw meal to which a part or the whole of the requisite amount of fuel may have previously been added. For this process considerable amounts of sinter returns are required ranging between 100 and 200% of the weight of the originating materials.

The invention contemplates a special preparation of the originating materials serving for the manufacture of cement or the like with a view to adapting them to the sintering operation on the grate, particularly an induced-draught grate, thus rendering the addition of sinter returns wholly or for its greater part superfluous.

According to the present invention the ground originating materials are distributed in a liquid medium and this mixture is treated with gas in the presence of moisture. By this means the originating materials are transformed into a porous and granulated condition and may be subjected to a sinter operation on the blast grate without admixture of sinter returns or adding only a small amount thereof, say 10-30% by weight.

Furthermore, it is an object of the invention to prepare for the manufacture of cement a mixture of the finely ground originating materials with a liquid medium, in which mixture the finely divided originating materials are in suspension to transform the finely ground originating materials of the mixture into crumbs and to sinter these crumbs mixed with fuel on a sintering grate by burning out the fuel by means of air sucked through the charge.

If sinter returns are added to the crumbs when charging them onto a sintering grate, one uses the fines produced when removing the sintered product from the blast grate and crushing the clinker to the desired size or when screening the clinker. It is, according to the invention, not necessary to use a larger amount of sinter returns for cement burning on the blast grate than obtained by this method.

Seeing that, according to the invention, the addition of sinter returns can wholly or partly be dispensed with, the throughput efficiency of the blast grate is considerably increased. At the same time the fuel consumption referred to an equal amount of finished product, is notably reduced and it is no longer necessary to crush a portion of the production of clinker as hitherto was required so as to obtain sufficiently large amounts of sinter returns.

The process according to the invention ensures a transformation of the originating materials into granules or crumbs containing larger or smaller inclusions of air and exhibiting, for example, a shell-like or spongy texture, or which have the form of hollow balls or fractions thereof.

This special texture is the reason why the charge prepared in accordance with the invention shows a particularly favourable behaviour when sintered on the blast grate.

To the water, the solution, the liquid mixture, the gas or steam used for the atomization of the material there may also be added substances such as soap, tar, fatty acids, oil and the like, which are adapted to impart sufficient tenacity and strength to the texture of the granules or crumbs.

The mixture of finely ground originating materials with a liquid medium according to the invention is obtained by starting from a mixture of the originating materials with the liquid medium, in which the originating materials are suspended. This mixture is brought into intimate contact with the gaseous medium which simultaneously has the task of evaporating the liquid medium to such an extent that the originating materials are transformed into a crumbly condition; hence the gaseous medium is used in a heated condition.

If the material so prepared, in admixture with fuel, which may be added before, during or after the transformation of the originating materials into granular condition, is disposed as a layer with the ordinary depth of about 15-30 for instance 20 cm. on a similar grate and ignited on the surface, it will burn to uniformly calcined clinker free from imperfectly burned portions.

Cement raw meal is, for example, first mixed with water, thus obtaining a suspension of raw meal in water. Or an already existing suspension, for instance cement raw slurry, is used. The suspension is placed in a vessel, the bottom of which is provided with a very large number of small openings. Below the bottom of the vessel is a wind chest into which exhaust hot gases, hot air or other hot gaseous medium (such as superheated steam) are introduced under pressure. The gases flow through the openings in the bottom of said vessel and bubble up through the slurry, thereby producing a powerful drying effect. At the same time, the whole of the slurry is caused to froth up and become permeated with minute air bubbles. The slurry gradually consolidates, through the evaporation of water, and assumes a specific moist earth-like condition, which can be dried, to a further slight extent, if necessary. The resulting crumbs of raw cement slurry are extremely suitable for direct burning to cement clinker on the sintering machine.

A further advantage of this process consists in the employment of the exhaust gases from the sintering apparatus for drying the slurry and producing the spongy texture.

In the drawings:

Fig. 2 depicts a similar view of a modified apparatus employed in carrying out the process of the invention;

Fig. 3 shows a cross sectional view taken on line III—III of Fig. 2;

Fig. 4 is an enlarged sectional and fragmentary view of one of the nozzles shown in Figs. 2 and 3 and of the protecting hood associated therewith;

Figure 1:
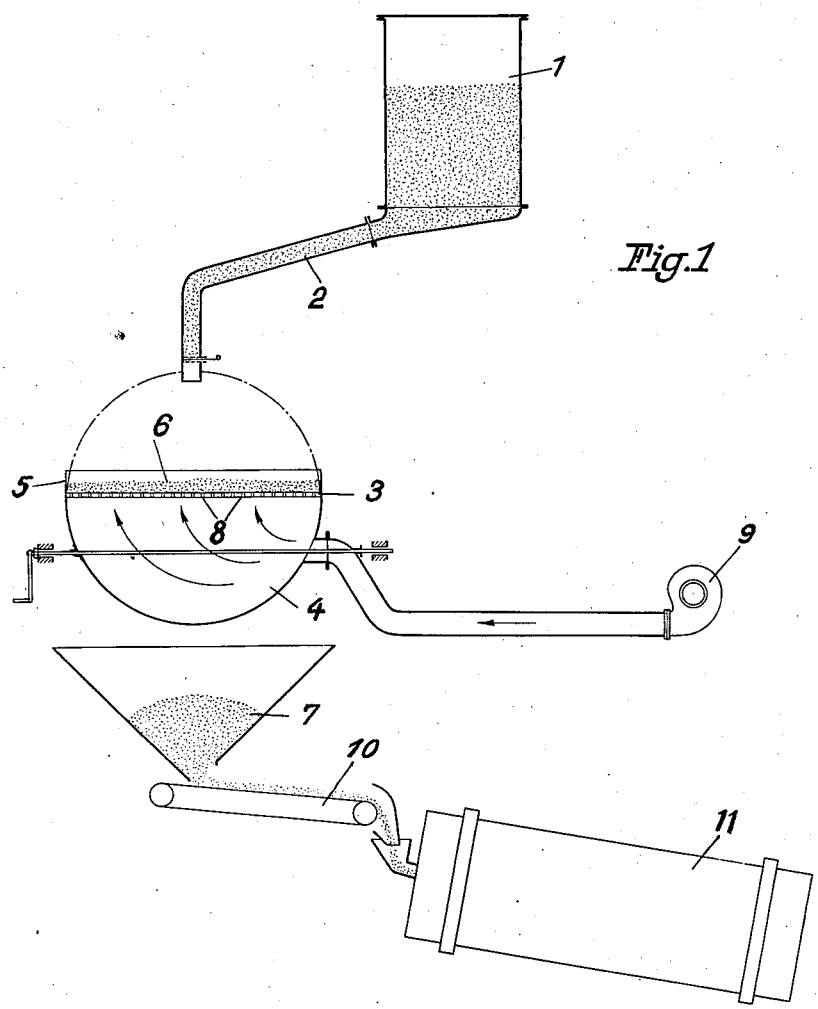
Fig. 1 illustrates a vertical sectional view of an apparatus for carrying the process of the invention into practice.

According to Figure 1 a vessel 1 contains a suspension of the finely divided originating materials in a liquid medium, e. g. cement raw slurry. Through the pipe 2 the slurry proceeds to the bottom 3 which is provided with nozzles 8 and the tipping vessel 5. The fan 9 forces the hot gases into the wind box 4. These gases after having flown through the nozzles in the bottom 3 bubble up through the slurry fed to the box 6 from vessel 1, thereby drying the slurry to the desired degree while at the same time the slurry is caused to froth up. After completion of the process the box 6 is tipped out, and the material thus prepared drops into the vessel 7 whence it may be brought by means of the discharge device 10 e. g. to a rotary drum 11 for further consolidating treatment and subsequently to the sinter plant.

The apparatus illustrated in Figs. 2, 3 and 4 makes it possible to carry out the process of the invention continuously. The apparatus for continuous operation comprises a vessel 27 from which the slurry is continuously fed to a rotary tube through a pipe 28. Inner jacket 30 of the rotary tube is provided with a large number of nozzles 33 to which the drying gases are fed through pipes 29 and an outer jacket 31 surrounding the inner jacket 30. As will be best observed in Fig. 4, each nozzle 33 is provided with a protecting hood 34 which prevents particles of the charge obstructing the passage of drying gases through the nozzle. Reference character 32 denotes the conventional driving mechanism of the rotary tube. For the introduction of the gases into the rotary tube, a stationary distributing head 23 is provided which is connected with a fan or blower 24 supplying the drying gases. A pair of sealing or packing members 36 are mounted on stationary distributing head 23 and provide a substantially gas tight seal with distributing pipes 29 rotating with inner and outer jackets 30, 31. As shown in Fig. 3, the space formed between jackets 30 and 31 is subdivided by means of partition walls 37 into a plurality of compartments, each compartment being connected with a distributing pipe 29. A packing plate or member 38 is mounted at the end of each partition wall 37, in order to provide a substantially gas tight seal between the adjoining compartments. Stationary distributing head 23 has an opening 35 provided in the lower portion thereof. Thus, during the rotation of jackets 30 and 31 at all times only one of the distributing pipes 29 and the compartment associated therewith will be in communication with the stationary distributing head 23, the one which happens to be in the lowest position. Therefore, as indicated by the arrows in Fig. 2, the drying gases supplied by blower 24 are caused to flow only through that portion of inner jacket 30 which is covered by the charge. The treated material is continuously discharged from the inner jacket 30 into a reservoir or vessel 25 and from this vessel it is carried by means of a vibrating or shaking conveyer 26 to the sintering plant. Vessel 25 is provided with an outlet opening 39 for the waste gases. Preferably, heating means in the form of a plurality of gas jets 40 are provided underneath outer jacket 31 of the rotary tube. Heating means 40 heat outer jacket 31 of the rotary tube and the gases entering from tube 29 to a high temperature so that the slurry to be dried and the foaming additions contained therein are decomposed.

The rotary tube having jackets 30 and 31 may be so constructed that after the treatment the charge is continuously discharged or the tube may be tipped after the treatment is finished, in order to discharge the treated material. In view of the fact that the tipping arrangement is of conventional character and does not form part of the invention, its illustration has been omitted from the drawings. The depth of the layer of slurry in the rotary tube should, preferably, not exceed 10 to 20 cm. The volume of the slurry is increased to many times its original value by the foaming process at the commencement of drying.

It has also been found advisable to carry out this method foaming process from the very beginning in a rotary drum, the whole or part of the shell of the drum 30 being provided with nozzles 33 or other suitable openings, through which the air, exhaust gases or the like, can be introduced and passed through the slurry while the drum 30 is being rotated.

Finally, one can also use a suspension of the originating materials of viscous, pulpy or pasty condition inflating it by rapid heating or the like, for example, by heating the outer jacket 31 of the rotary tube by means of gas jets 40 whereby the gaseous medium is heated up to such a degree that the foaming substances added to the slurry are decomposed or are inflated by heat.

Figure 5:
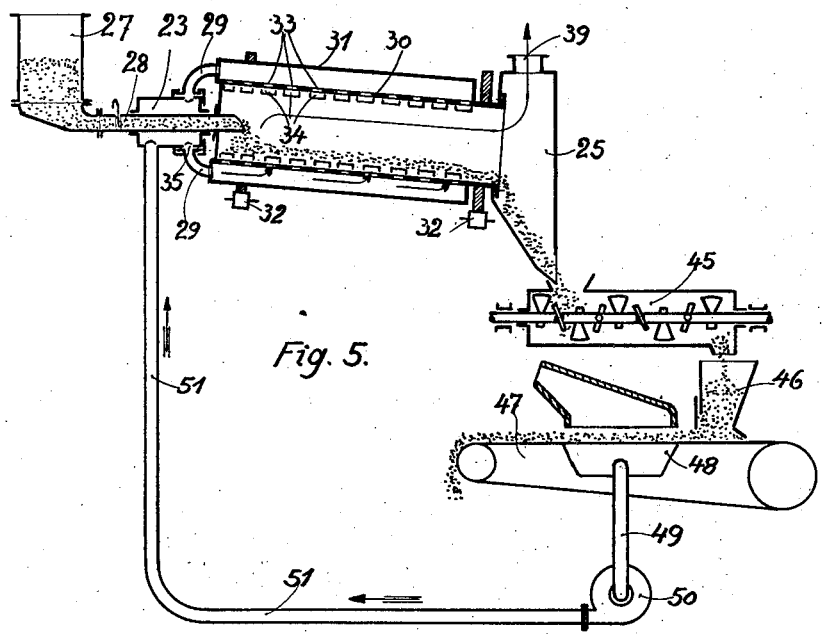
Fig. 5 illustrates a vertical sectional view of a modified apparatus for carrying out the process of the invention.

The invention also enables cement raw slurry to be dried by exhaust gases, in a simple manner, so that the burning process does not require any greater amount of heat than in burning dry raw material. An apparatus of this type is illustrated in Fig. 5 in which reference character 47 denotes a sintering apparatus having a wind box 48 and a hopper 46 through which material to be sintered is fed to the apparatus. Wind box 48 is connected to a blower 50 by means of a conduit 49, the blower in turn being connected by means of a conduit 51 to the distributing head 23 which distributes the hot exhaust gases between the various sections of the rotary tube. In view of the fact that the rotary tube illustrated in the upper portion of Fig. 5 is identical with the one shown in Fig. 2 and identical reference characters have been employed to denote corresponding parts, no detailed description of the rotary tube and of its operation will be necessary. The raw cement slurry, after it has been dried in the rotary tube, is slightly consolidated in a bladed conveyor 45 and is charged onto the rotary hearth 47 where it is subjected to a final burning treatment.

Figures 6, 7:
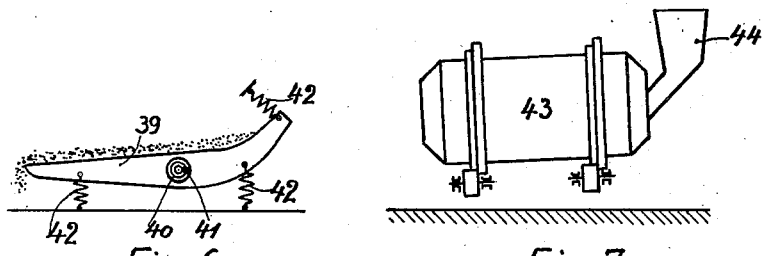
Fig. 6 depicts a side elevational view of a vibrating table employed in the process of the invention.
Fig. 7 shows a rotary drum mounted in an inclined position, employed in the process of the invention for consolidating the crumbs of the treated material.

Fig. 6 illustrates a vibrating table which may be employed in the apparatus shown in Fig. 5 instead of the bladed worm or conveyor 45. Vibrating table 39a is resiliently mounted on springs 42 and is maintained in vibrations by means of a rotary shaft 40 and an eccentric 41. Fig. 7 depicts a rotary drum 43 mounted in a slightly inclined position and having a feed hopper 44. The vibrating table or the rotary drum may be employed with equal or similar results for slightly consolidating the crumbs produced from the raw slurry of finely ground raw materials, as those skilled in the art will readily understand.

I claim:

1. The process of producing cement which comprises forcing a hot finely distributed gas stream through a raw slurry of finely ground raw material in such amounts as to transform said slurry into porous crumbs, admixing fuel to said crumbs, charging said crumbs in admixture with fuel onto a grate, and forcing air through said charge on said grate to cause burning of said fuel and sintering of said crumbs.

2. The process of producing cement which comprises mixing a raw slurry of finely ground raw materials with substances selected from the group consisting of fatty and tarry liquids, acids and oils, to consolidate the texture thereof, forcing a hot finely distributed gas stream through said raw slurry to transform the same into porous crumbs, admixing fuel to said crumbs, charging said crumbs in admixture with fuel onto a grate, and forcing air through said charge on said grate to cause burning of said fuel and sintering of said crumbs.

3. The process of producing cement which comprises forcing a hot finely distributed gas stream through a raw slurry of finely ground raw materials in such amounts as to transform said slurry into porous crumbs, agitating said crumbs to slightly consolidate the same, admixing fuel to said crumbs, charging said crumbs in admixture with fuel onto a grate, and forcing air through said charge to cause burning of said fuel and sintering of said crumbs.

4. The process of producing cement which comprises forcing a hot finely distributed gas stream through a raw slurry of finely ground raw materials in such amounts as to transform said slurry into porous crumbs, slightly consolidating said crumbs in a bladed worm, admixing fuel to said crumbs, charging said crumbs in admixture with fuel onto a grate, and forcing air through said charge to cause burning of said fuel and sintering of said crumbs.

5. The process as claimed in claim 3 in which the crumbs are slightly consolidated by shaking conveyers.

6. The process as claimed in claim 3 in which the crumbs are consolidated by vibrating means.

7. The process as claimed in claim 3 in which the crumbs are consolidated in a rotary drum.

8. The process of producing cement which comprises adding foaming substances to a raw slurry of finely ground raw material, forcing a hot finely distributed gas stream through said raw slurry to transform the same into porous bodies including porous crumbs, bubbles, shells and the like, admixing fuel to said bodies, charging said porous bodies in admixture with fuel onto a grate, and forcing air through said charge to cause burning of said fuel and sintering of said porous bodies.

9. The process of producing cement which comprises adding foaming substances to a raw slurry of finely ground raw materials, forcing a hot finely distributed gas stream through said raw slurry to transform the same into porous bodies including porous crumbs, bubbles, shells, and the like, rapidly heating said porous bodies to inflate the same, admixing fuel to said bodies, charging said bodies in admixture with fuel onto a grate, and forcing air through said charge to cause burning of said fuel and sintering of said porous bodies.

HELMUT WENDEBORN.